(No Model.)
H. H. ANGELL.
CHECK BOOK.
No. 538,491. Patented Apr. 30, 1895.
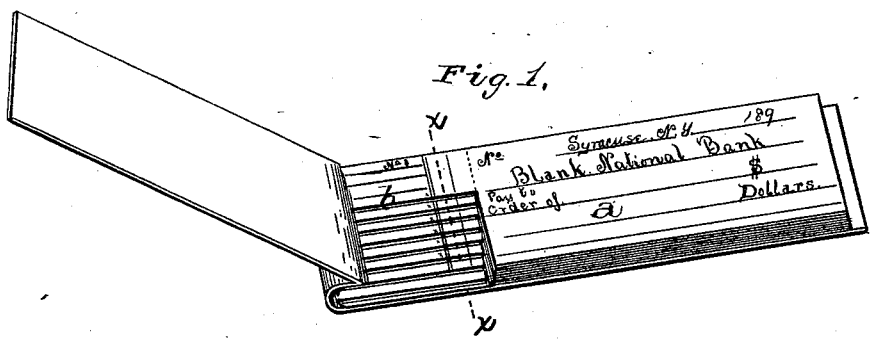
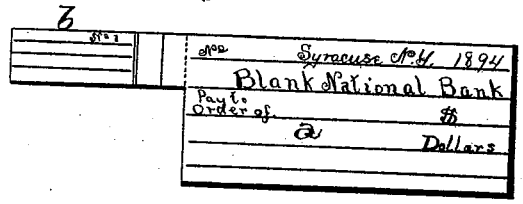
WITNESSES:
INVENTOR
Henry H. Angell
BY
Smith & Brinson
ATTORNEYS.

UNITED STATES PATENT OFFICE.

HENRY H. ANGELL, OF ITHACA, NEW YORK.

CHECK-BOOK.

SPECIFICATION forming part of Letters Patent No. 538,491, dated April 30, 1895.

Application filed July 18, 1894. Serial No. 517,840. (No model.)

*To all whom it may concern:*

Be it known that I, HENRY H. ANGELL, of Ithaca, in the county of Tompkins, in the State of New York, have invented new and useful Improvements in Check-Books, of which the following, taken in connection with the accompanying drawings, is a full, clear, and exact description.

This invention relates to check books, and more particularly to small check books adapted for pocket use.

My object is to produce a check book for pocket use, so constructing the individual checks and stubs that the amounts checked out will appear the same as in a check book having a multiplicity of checks on each page, thereby allowing the amounts of each check to stand exposed upon the stubs, so that they may be readily added and checked from the bank balance indicated upon the previous page, and to that end my invention consists in the several new and novel features and combination of parts hereinafter described and which are specifically set forth in the claim hereunto annexed. It is constructed as follows, reference being had to the accompanying drawings, in which—

Figure 1 shows a view of my check-book opened, showing check, No. 1 and stub No. 1 and the bottom lines of several succeeding stubs. Fig. 2 is a view of a check and stub detached. Fig. 3 is a cross-section on line x x, Fig. 1.

Similar letters of reference indicate corresponding parts.

—$a$— is a check ruled and lettered in the ordinary way.

—$b$— is a stub secured to its upper left hand corner ruled as desired and numbered to correspond with the check —$a$—. The succeeding check is similarly constructed with the exception that the stub —$b$— is a little wider than the No. 1 check, so as to allow it to extend down below the stub of the preceding check so that the amount checked out may be indicated at the lower edge of the stubs, so that when they are all put together as shown in Fig. 1, the amounts checked out may be readily added and subtracted from the bank balance on the previous page.

Having described my invention, what I claim, and desire to secure by Letters Patent, is—

In a check book, a number or series of checks, each one of which has a stub of the same length formed upon its upper left hand corner, the stub of the upper check being the narrowest one of them all, and the stub of each succeeding one becoming wider, so that they form a series of steps from the top of the book toward the botom, thus keeping constantly exposed the amount for which each check was drawn, substantially as shown.

In witness whereof I have hereunto set my hand this 28th day of June, 1894.

HENRY H. ANGELL.

In presence of—
  H. M. HIBBARD,
  J. H. JENNINGS.